Aug. 14, 1962  J. H. LEAT ET AL  3,049,195
DEMOUNTABLE PARTITIONS
Filed Jan. 8, 1960  9 Sheets-Sheet 9

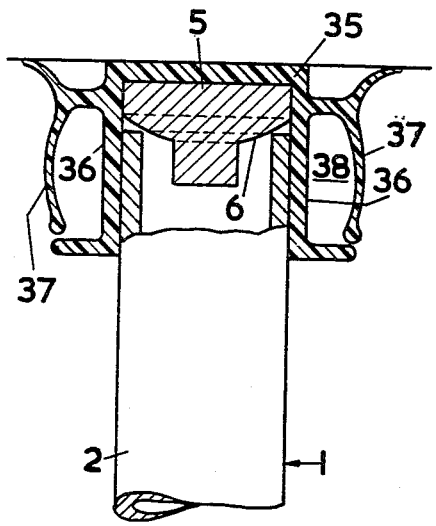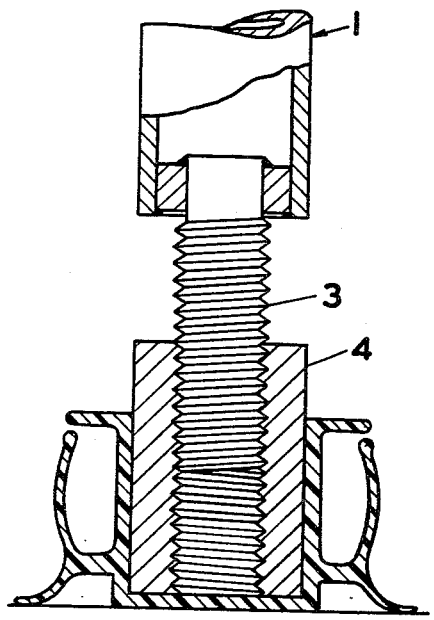
FIG. 1.

Inventors
JAMES HARRISON LEAT, HUGH WALLACE ROBARTS, THOMAS HENRY GIBBS
BY Larson and Taylor Attorney

United States Patent Office 3,049,195
Patented Aug. 14, 1962

3,049,195
DEMOUNTABLE PARTITIONS
James Harrison Leat, Epsom, Hugh Wallace Robarts, Surbiton, and Thomas Henry Gibbs, London, England, assignors to National Research Development Corporation, London, England, a corporation of Great Britain
Filed Jan. 8, 1960, Ser. No. 1,371
Claims priority, application Great Britain Jan. 9, 1959
8 Claims. (Cl. 189—34)

This invention relates to easily demountable partitions and provides a method of and components for erecting such partitions without, or with very little, use of positive fixing means such as nails, screws or bolts.

The invention comprises a system of demountable partitions wherein panels are supported, between stanchions or between a stanchion and a flat surface, by means of panel grips having a channel for engaging the surface of a stanchion or means for providing a grip on a flat surface, and at least one groove for receiving the edge of a panel.

The stanchions may rest on or be anchored to the floor or may be extensible and anchored in position by pressure between their ends and substantially parallel surfaces.

For example each stanchion may consist of a rod or tubular member of any convenient cross-section, for example, circular, and may be made in two parts connected by a screwed joint to provide extensibility. A stanchion is positioned as required between two parallel surfaces such as the floor and ceiling of a room and is fixed by extending it until the two ends press against the two surfaces to hold it firmly in position. It should be understood that the term stanchion, as used herein, includes horizontal or inclined as well as vertical members.

In order to assemble a panel, appropriate panel grips are placed on two opposite edges of the panel, one edge is placed in position so that its grips engage a flat surface or a stanchion, and a stanchion or another stanchion is positioned in the engaging grooves of the grips on the free edge of the panel, which stanchion is thereafter extended to fix it in the desired position.

Figure 2:
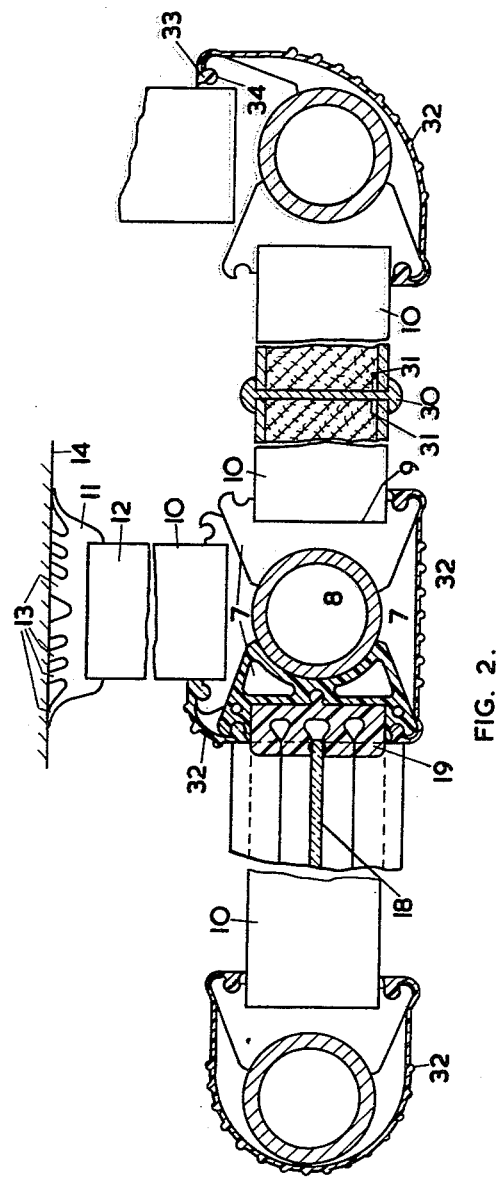
Figure 3:
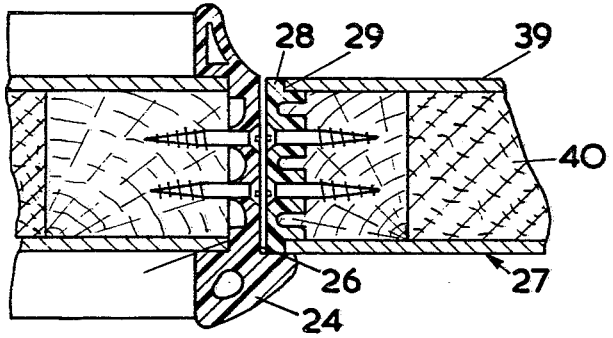
Figures 4, 4A:
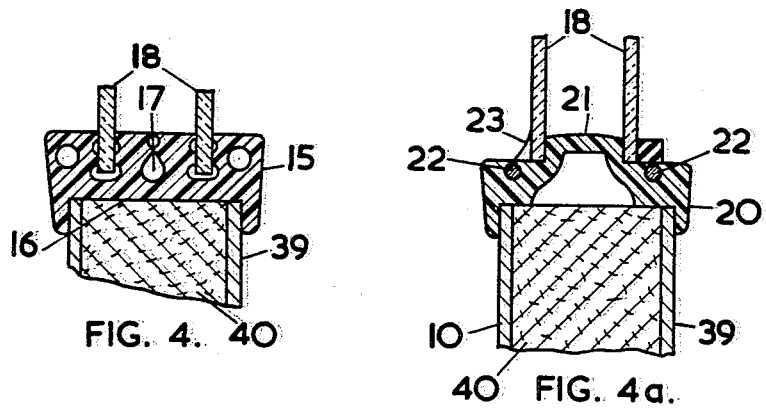
Figure 5:
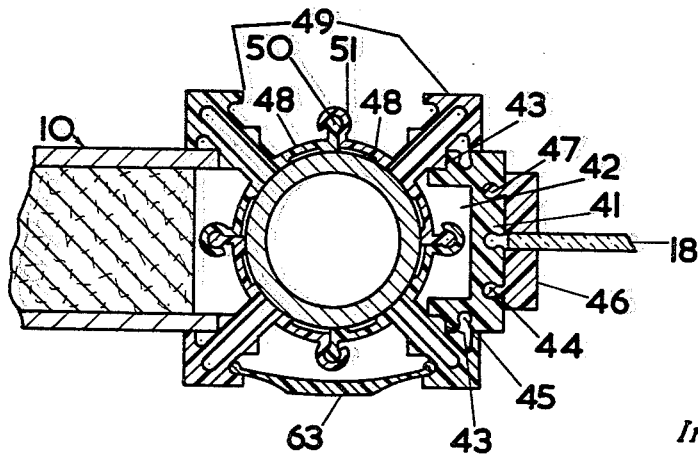
Figure 6:
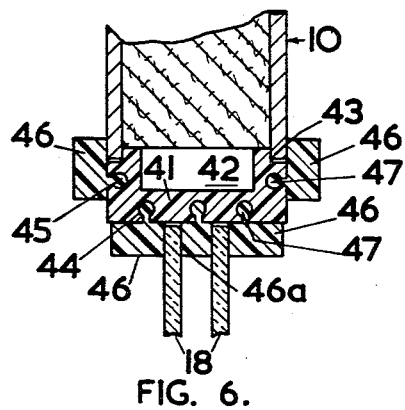
Figure 7:
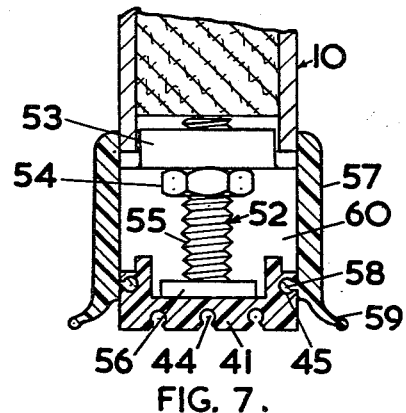
Figure 8:
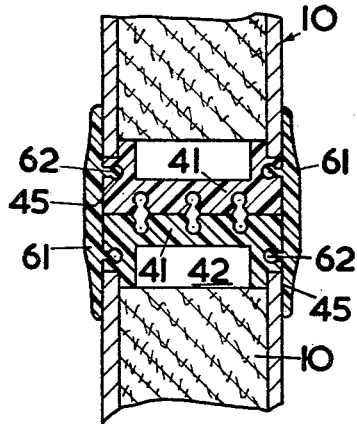
Figure 10:
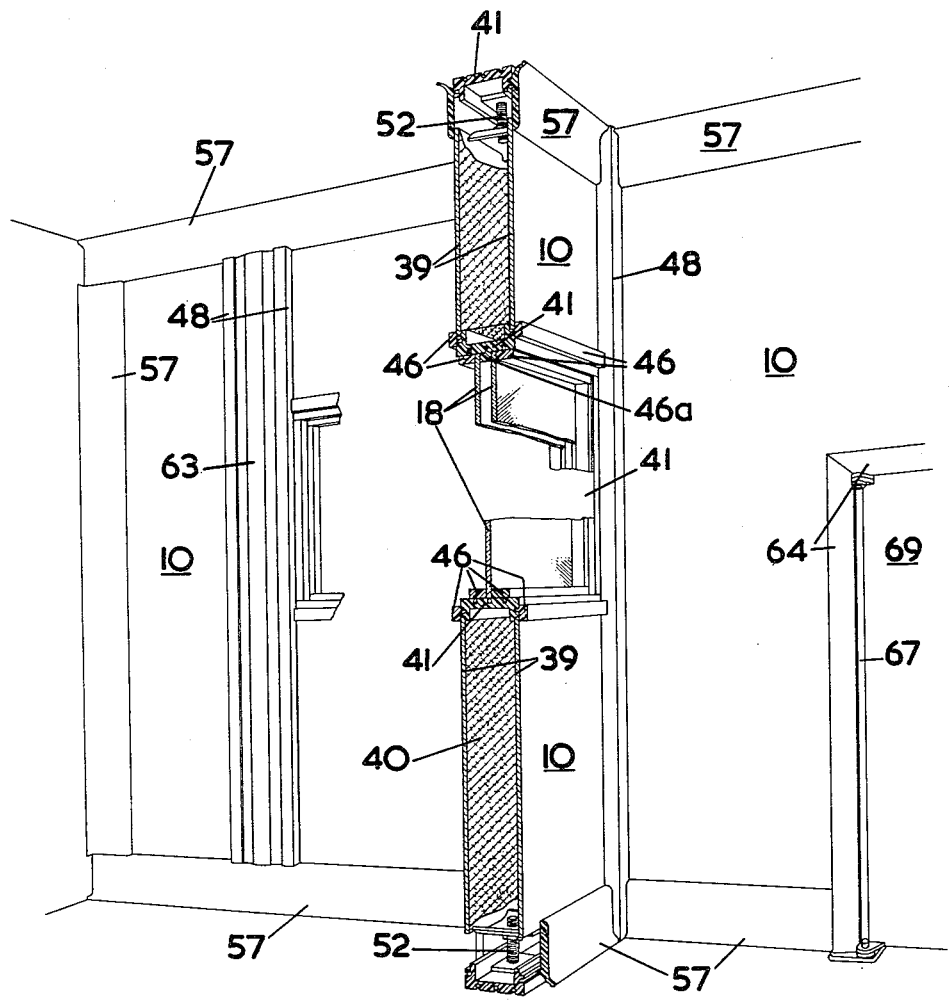
Figure 11:
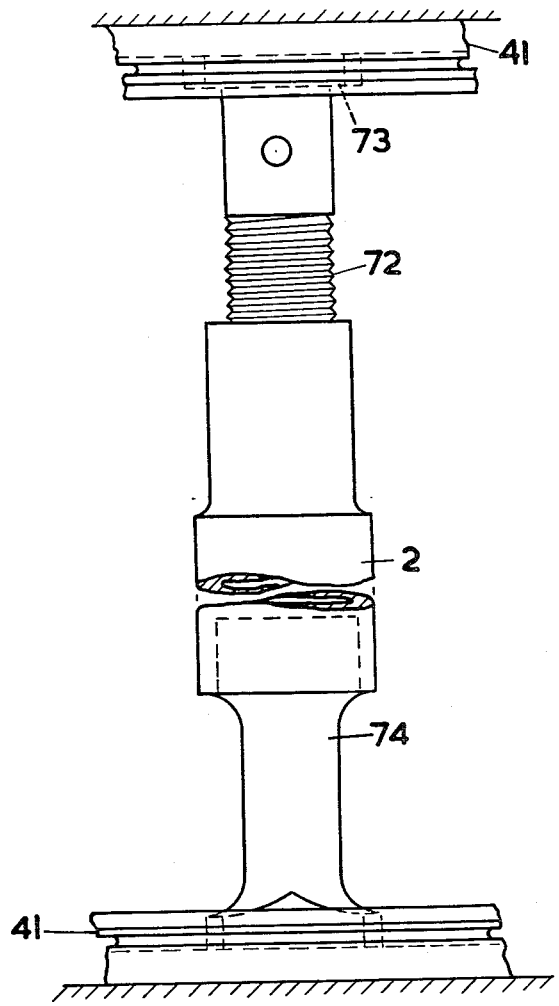
Figure 12:
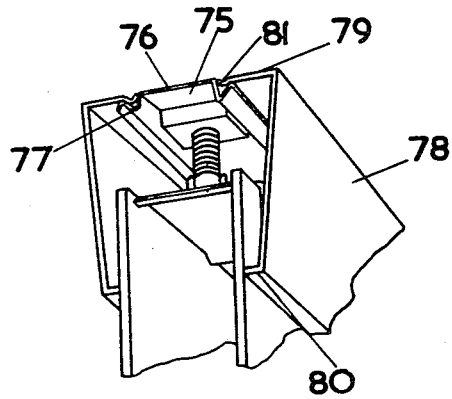
Figure 16:
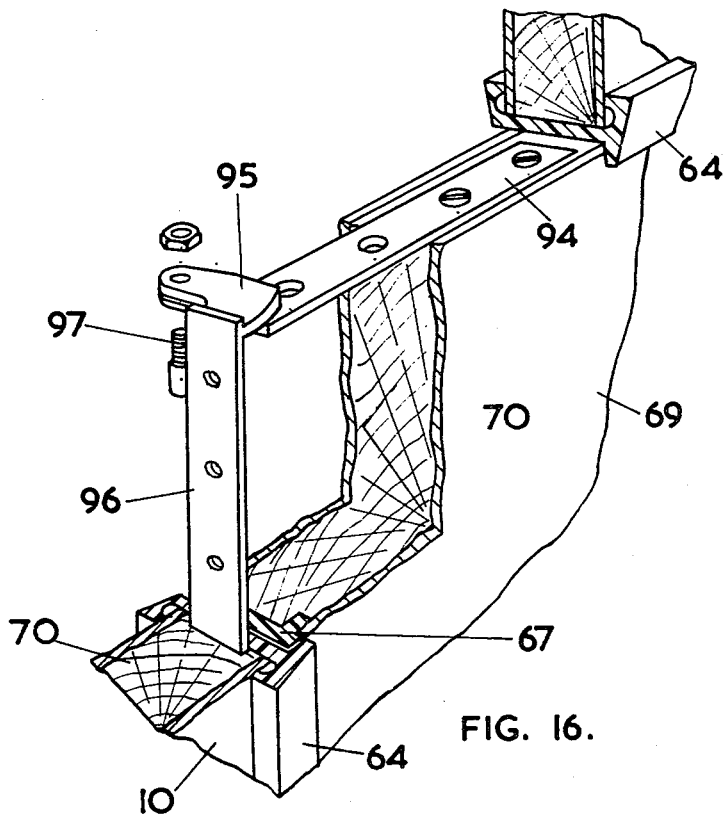
Figure 14:
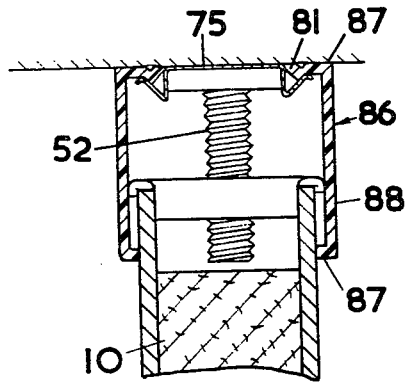
Figure 15:
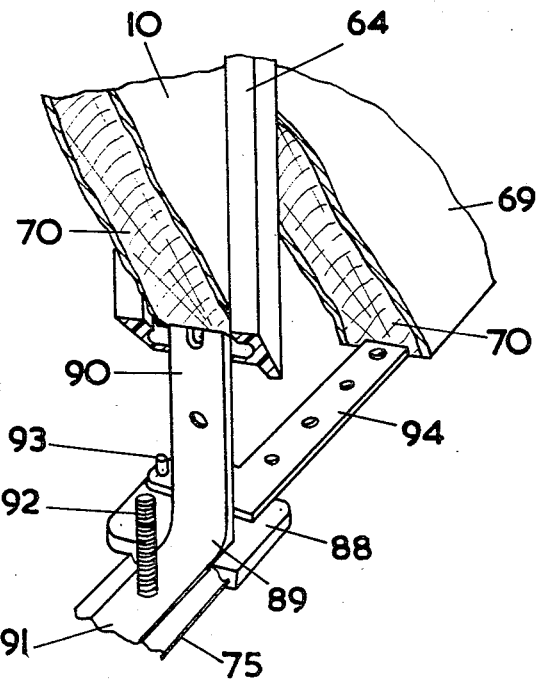
Figure 9:
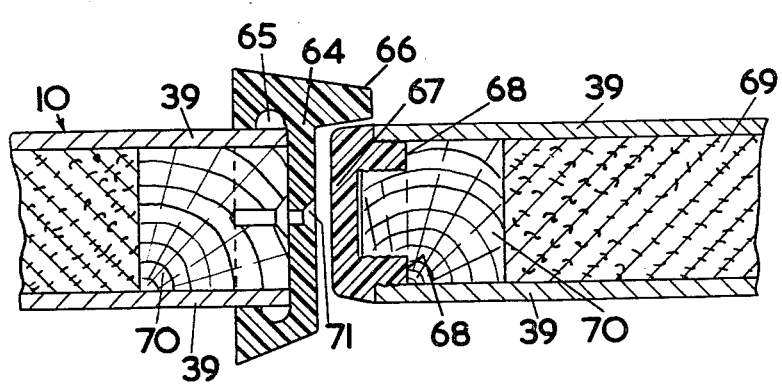
Figure 13:
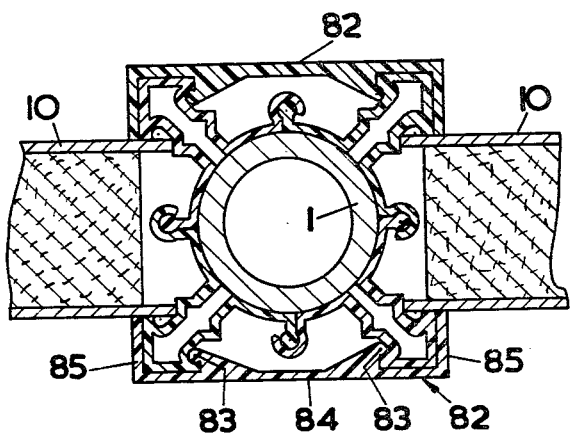
Figure 17:
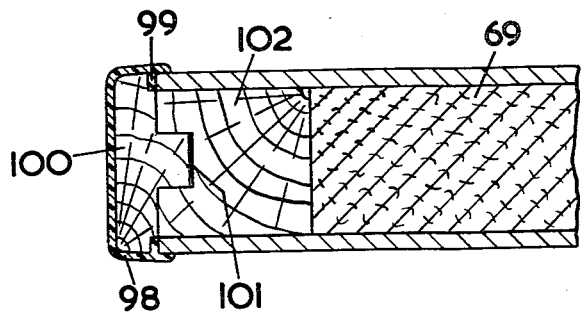

A variety of components and accessories, suitable for constructing partition walls, will now be particularly described by way of example only, with reference to the accompanying drawings in which:

FIG. 1 is an elevation of a stanchion,
FIG. 2 is a composite sectional view showing various components of a partition,
FIG. 3 is a section through one edge of a doorway,
FIG. 4 is a section showing a method of glazing,
FIG. 4a is a section showing an alternative method of glazing,
FIG. 5 is a section through a stanchion showing an alternative panel grip,
FIG. 6 is a section of an alternative form of glazing,
FIG. 7 is a section through the edge of a panel adjacent a flat surface,
FIG. 8 is a section of a butt joint,
FIG. 9 is a section showing an alternative door jamb and edging,
FIG. 10 is a perspective view of a portion of partitioning,
FIG. 11 is an elevation of an alternative stanchion,
FIG. 12 is a perspective view of a panel edge adjacent a flat surface,
FIG. 13 is a section through a stanchion,
FIG. 14 is a sectional view of a panel edge adjacent a flat surface,
FIG. 15 is a perspective view of a lower door hinge assembly,
FIG. 16 is a perspective view of an upper door hinge assembly,
FIG. 17 is a section showing an alternative door edge.

Stanchions 1 (FIG. 1) comprise cylindrical tubular members 2 each having a threaded rod 3 fixed into, and extending longitudinally from, one end and, screwed onto the rod 3, an internally threaded tubular extension 4. In order to provide good contact with floor and ceiling, a loose plug 5, having a flat upper surface for engaging the ceiling and having, if desired, a domed lower surface 6 to engage the end of the tubular member 2, is inserted into the upper end of the stanchion 1. The plug 5 facilitates firm fixing of the stanchion 1 when floor and ceiling are not exactly parallel.

Panel grips 7 (FIG. 2) which may be of any convenient length or may be provided in a variety of convenient lengths, are substantially trapezoidal in cross section. The narrower parallel face of each grip 7 has a longitudinal, part cylindrical groove 8 of such dimensions that it will fit the curved surface of a stanchion 1, and the wider parallel face has a longitudinal rectangular groove 9 for receiving the edge of a panel 10. The panels 10 may be of any convenient size and may be provided in a variety of sizes for various requirements.

Special panel grips 11 are provided for gripping flat surfaces so that one end of a panel 10 may abut an existing wall. These grips 11 are of a flexible material such as P.V.C. (polyvinyl chloride) and have in one face a rectangular groove 12 for receiving the panel 10 and on the other face a plurality of flexible ribs 13 which distort under pressure and splay outwardly to prevent lateral slipping along the wall surface 14. This type of grip may be provided in strips to extend for the full height of the partition.

Glazing may be fitted into suitable apertures in the panelling by means of glazing strips 15 (FIG. 4) of P.V.C. or other flexible material having, in one side, a groove 16 to fit the edge of a panel 10, and in the other side, one or more channels 17 to receive single or double glazing 18. The glazing channels 17 are preferably narrower at their outer ends to provide a firm grip on the glazing panels 18. Glazing strips 15 are normally arranged along the full length of all four sides of the aperture to be glazed. Modified glazing strips 19 (FIG. 2) may be fitted into panel grips 11 on stanchions 1 where the glazing is required to extend the full width of a span. Alternative glazing strips 20 (FIG. 4a) may have a central longitudinal rib 21 on one side, on either side of which is an undercut longitudinal groove 22. Glazing panels 18 may be fitted on one or both sides of the central rib 21 and retained by clips or strips 23 of flexible material shaped to be sprung into the grooves 22 and to press against the outer surfaces of the glazing panel or panels 18.

Door jambs and lintels 24 (FIG. 3) may be provided by P.V.C. or other strip having, in one side, a rectangular groove 25 to fit the edge of the panel 10 surrounding the door aperture, and, in the other side, a rebate 26 into which the door 27 is arranged to fit when closed. Door edges 28 may also be provided and are substantially rectangular in section having rebates 29 on two adjacent edges to enable the strips to be fitted into recesses along the edges of the door 27.

Where butt joints between panels 10 are necessary they may be secured and covered by means of I-sectioned strip 30 (FIG. 2), the edges of the two abutting panels 10 being inserted into the recesses 31 on either side of the strip 30.

The visible parts of all accessories described may be shaped to give a pleasing or decorative finish. Additional decorative mouldings may be provided to cover otherwise unsightly parts of the partitioning. For example thin strips 32 (FIG. 2) of P.V.C. or other flexible material may be used to cover the panel grips 7 around the stanchions 1. These may conveniently be fixed by means of ribs 33 on or near the edges of the strips 32, which ribs 33 are designed to be sprung into undercut grooves 34 provided in the panel grips 7; the widths of the strips may be suitable for covering straight joints, internal or external corners or flying corners as shown in FIG. 2. A further striu 35 which may be provided for covering the panel edges which abut the floor or ceiling is of generally U-shaped section and the arms 36 of the U-section may carry on one or both outer surfaces a moulding 37 suitable for a corner moulding or skirting. This last mentioned strip 35 may extend over both the panels 10 and the stanchions 1 and will provide protection for surfaces between which the partitioning is mounted and the mouldings 37 may include a tube or channel 38 in which to accommodate services such as electrical or telephone wiring.

Any convenient material may be used for the panels 10, for example double panels comprising two sheets 39 of plastic coated building board separated by suitable spacers or filling 40. If desired the stanchions 1 may also be plastic covered.

In an alternative construction shown in FIGS. 5 to 10 use may be made of two multipurpose strips. One such strip 41, hereinafter called a channel strip, is of rectangular overall cross section having a rectangular channel 42 in one of its wider faces; the edges of that face being rebated at 43. In the opposite face of the strip 41 are three smaller undercut grooves 44; and two similar undercut grooves 45 are provided, one in each narrow face of the strip 41. The second, or fixing strip 46 (FIG. 6) is of smaller rectangular section having on one face a rib 47 adapted to be sprung into one of the undercut grooves 44, 45 of the channel strip 41.

An alternative form of panel grip is used on stanchions and may be built up from four similar strips 48 (FIG. 5), each surrounding a quarter of the stanchion 1 and each having a radially projecting wing 49 extending centrally therefrom. Means such as interlocking ribs 50 and grooves 51 are provided for locking the strips 48 edge to edge so that four strips 48 form a complete jacket around the stanchion 1. The four radially projecting wings provide four recesses therebetween for the reception of from one to four panels which may be arranged in any of four directions at 90° intervals around the stanchion 1. If preferred the jacket may be formed as a single tubular moulding having two, three or four projecting wings 49.

The channel strip 41 may be used for lining apertures in panels (FIGS. 6 and 10), the two facing boards 39 of a panel 10 being fitted into the rebates 43 and retained by fixing strips 46 sprung into the undercut grooves 45 on the narrow faces of the channel strip 41. Single or double glazing 18 may be attached to the triple grooved side of the channel strip 41 and retained by fixing strips 46 sprung into the adjacent undercut grooves 44 on either side of the glazing panels 18. A slightly modified fixing strip 46a may be inserted between the panels 18 of double glazing. The channel strips 41 may also be fitted into panel grips 48, as shown in FIG. 5, to carry glazing or may be used to protect the surface against which a panel abuts, in which case corner moulding or skirting strips may be attached by means of the undercut grooves 45 in the narrow faces of the channel strip 41.

Where a panel abuts a smooth surface such as a wall, ceiling or floor (as shown in FIG. 7) the abutting edge may be fixed by means of small screw jack devices 52 having a member 53 for gripping the edge of a panel 10 and an adjusting nut 54, on a bolt 55 having a flat head 56 whose distance from the panel spacing member 53 may be varied by rotating the nut 54. The head 56 of the bolt 55 may be located in a multipurpose channel strip 41, the gap between the floor or ceiling and the panel being covered by a suitable moulding or skirting strip 57. The skirting strip 57 has a rib 58 for insertion into the groove 45 of a channel strip 41 and the edge 59 below the rib 58 is flexible and may be splayed outward in contact with the abutting surface. The channel 60 thus enclosed may be used to carry electrical or telephone leads.

Panels may be butt jointed, as shown in FIG. 8, by fixing a channel strip 41 to the edge of each panel 10 and fastening by means of a cover strip 61 on each side of the joint. The cover strip 61 has two ribs 62 on one face which ribs are sprung into the undercut grooves 45 of the channel strips 41. Stanchions may be provided with a more pleasing finish by inserting decorative strips 63 (FIGS. 5 and 10), similar to the cover strips 61 but without the ribs 62, into the channels 42 which are not occupied by panels or glazing.

Alternative door lintels and jambs 64 (FIG. 9) may be provided in the form of strips having, on one side, a recess 65 for reception of a panel 10 and on the other a projection 66 against which the door abuts when closed. Door edges 67 have two serrated ribs 68 on one side adapted to be inserted between the facing boards 39 of a panel which forms the door 69. If desired, wood inserts 70 may be inserted around the edges of the panels forming the door and surround, and the lintels and door edges may be more firmly attached by inserting a few wood screws 71. Door hinges may be attached in any suitable manner, one method will be hereinafter described.

FIG. 10 is a composite perspective view of erected panelling using the components shown in FIGS. 5 to 9. The same numerals are used throughout FIGURES 5 to 10 to indicate equivalent parts.

In the alternative form of stanchion, shown in FIG. 11, the tubular member 2 has in one end an extension bolt 72 carrying a rectangular plate 73 which is rotatable on the bolt 72 and can be fitted within a channel strip 41. At the lower end of the tubular member 2 is inserted a plug 74 whose lower end is shaped to fit into a channel member 41. The stanchion is inserted in position in the two channel strips 41 one on each of the surfaces, for example floor and ceiling, between which the stanchion is to be erected and fixed by extending the bolt 72 until a firm grip is achieved.

Various minor modifications are shown in FIGS. 12, 13, 14. In FIG. 12 a metal channel 75 is used in place of the channel strip 41 for carrying screwjacks 52 or stanchions (not shown). The channel 75 has a flat central portion 76 which is in contact with the ceiling and at each edge carries a V-shaped flange 77. A modified skirting strip 78 is in the form of a U-channel having unequal arms 79, 80 the longer of which 79 carries at its outer edge, a rib 81 which engages the flange 77 of the metal channel 75. The shorter arm 80 of the skirting strip 78 abuts against a panel 10, supported as previously described by screwjacks 52.

Modified decorative strips 82 (FIG. 13) are of U sectional channel having two ribs 83 on the inner face of the channel base 84. The ribs 83 of this strip are arranged to clip into the wings 49 of panel strips 48, the arms 85 of the strips 82 fitting outside the wings 49 to provide a smooth rectangular finish around a stanchion 1. A slightly modified skirting strip 86 (FIG. 14) may be used along walls. This strip is similar to the skirting strip 78 shown in FIG. 12 but has equal arms 87 at right angles to the base 88 of the strip so that its appearance matches that of the decorative strip 82 around the stanchions. The upper arm carries a rib 81 for engaging a metal channel 75 which carries screw jacks 52.

One method of fixing door hinges is shown in FIGS. 15, 16. The bottom hinge (FIG. 15) comprises a hinge plate 88 welded to an angle bracket 89 one arm 90 of which bracket is inserted along the door aperture the other arm 91 resting in a metal channel 75. The arm 91 may have welded thereto threaded studs 92 which may be used to replace the bolt 55 of screws jacks 52 such as are shown in FIG. 7. The vertical arm 90 may, if desired, be screwed to the wood insert 70 surrounding the door aperture and covered by a lintel strip 64. The hinge plate 88 carries a stud 93 on which is mounted a hinge 94 screwed to the wood insert 70 along the bottom of the door 69. The upper hinge (FIG. 16) comprises a hinge plate 95 welded to or integral with a metal strip 96 which is screwed to the wood insert 70 lining the door aperture. A hinge 94, screwed to the wood insert 70 at the upper edge of the door 69 is attached to the hinge plate 95 by a hinge pin 97.

An alternative door edging strip 98 is shown in FIG. 17 and comprises a U section strip having ribs 99 on the inner faces of its arms. A T-shaped wooden insert strip 100 is inserted into the edging strip and attached to the edge of the door, the stalk of the T being fixed into a groove 101 in a wooden insert 102 in the door edge.

It will be understood that the stanchions may be of any suitable cross section, the surfaces of the panel grips in contact therewith being correspondingly shaped.

All the strip components hereinbefore described, except the metal channel strip, may conveniently be made of a plastic material such, for example, as P.V.C., and may be manufactured by an extrusion process. Some components such as panel grips and glazing strips may be made from a fairly rigid grade of material while a more flexible grade may be used for such components as fixing strips, skirting strips and the decorative moulding strips.

We claim:

1. Demountable partitioning for erection between a pair of parallel surfaces comprising extensible stanchions supported by endwise pressure between the parallel surfaces; panel grips each consisting of a plurality of prefabricated strips extending longitudinally of a stanchion in contact with its surface, a rib along one edge of each strip in the other edge of which is formed a groove, the rib of each strip being interlocked with the groove of an adjacent strip to form a jacket around the stanchion, and longitudinal wing flanges extending radially outward from the strips forming panel receiving grooves therebetween; and wall panels seated in said panel receiving grooves and extending between the stanchions.

2. Demountable partitioning as claimed in claim 1 wherein the wall panels are spaced from the parallel surfaces between which the stanchions are supported and having, at intervals between stanchions, small screwjack devices extending between the edges of the wall panels and the adjacent parallel surfaces to support the panels between the said surfaces.

3. Demountable partitioning as claimed in claim 1 having glazing strips supported between stanchions, one side of each strip being longitudinally grooved; panels of sheet material mounted in contact with the grooved sides of said glazing strips; and flexible beading strips engaged in the grooves of the glazing strips and bearing on the faces of the panels of sheet material to retain them in position.

4. Demountable partitioning as claimed in claim 1 having glazing strips fitted into the panel receiving grooves, each glazing strip having on the face remote from the panel receiving groove a longitudinal glazing rib adjacent on which is formed, on at least one side thereof, a longitudinal undercut groove; glazing mounted on the glazing strips in contact with one side of the glazing ribs; and flexible beading strips each engaged in an undercut groove and bearing on the surface of the glazing on the side thereof remote from the glazing rib to retain said glazing against said rib.

5. Demountable partitioning as claimed in claim 4 having further similar glazing strips fitted to the edges of wall panels adjacent the glazing, the glazing ribs abutting one surface of the glazing; and additional flexible beading strips engaged in undercut grooves of the further glazing strips and bearing on the other side of the glazing to retain it against the ribs.

6. Demountable partitioning as claimed in claim 1 having multipurpose channel strips fitted into the panel receiving grooves, each channel strip being of substantially rectangular overall cross-section having two wider faces in which are formed, respectively, a longitudinal rectangular channel and a plurality of longitudinal undercut grooves, and two edges in each of which is formed a longitudinal undercut groove, the channelled face being within the panel receiving groove; thin panels of sheet material mounted with edges adjacent multigrooved faces of channel strips; and flexible beading strips on each side of, and bearing on the surface of, the panels of sheet material, each beading strip having, on one side, a longitudinal rib, said rib being engaged in an undercut groove of a channel strip adjacent a panel of sheet material.

7. Demountable partitioning as claimed in claim 6 having further, similar channel strips fitted to the edges of wall panels adjacent panels of sheet material the multigrooved faces of the channel strips being toward the sheet material; and additional similar flexible beading strips on each side of, and bearing on the surface of, the sheet material, the ribs of the additional beading strips being engaged in undercut grooves in the further channel strips.

8. Demountable partitioning as claimed in claim 6 in which wall panels are spaced from adjacent parallel surfaces and having similar channel strips whose multigrooved faces are in contact with said parallel surfaces and in which channel strips the stanchions are seated; small screwjack devices seated in the said channel strips at intervals between stanchions and extending between the channel strips and the adjacent edges of wall panels to support said wall panels; and flexible skirting strips covering the gap between the wall panels and adjacent parallel surfaces each skirting strip having, on one face thereof, a rib which is engaged in the undercut groove in an edge of a channel strip.

References Cited in the file of this patent

UNITED STATES PATENTS 2,085,281    Wagoner    June 29, 1937

FOREIGN PATENTS 675,016    Great Britain    July 2, 1952